(12) United States Patent
Pace

(10) Patent No.: US 7,424,157 B2
(45) Date of Patent: Sep. 9, 2008

(54) APPARATUS AND METHOD FOR PROCESSING IMAGE DATA

(75) Inventor: Charles Paul Pace, North Chittenden, VT (US)

(73) Assignee: Euclid Discoveries, LLC, Concord, MA (US)

( * ) Notice: Subject to any disclaimer, the term of this patent is extended or adjusted under 35 U.S.C. 154(b) by 0 days.

(21) Appl. No.: 11/605,549

(22) Filed: Nov. 29, 2006

(65) Prior Publication Data

US 2007/0071336 A1  Mar. 29, 2007

Related U.S. Application Data

(63) Continuation of application No. 11/191,562, filed on Jul. 28, 2005, now Pat. No. 7,158,680.

(60) Provisional application No. 60/598,085, filed on Jul. 30, 2004.

(51) Int. Cl.
  *G06K 9/36* (2006.01)
  *G06K 9/20* (2006.01)
(52) U.S. Cl. .................................. 382/232
(58) Field of Classification Search ............... 382/107, 382/199, 232–253, 103, 282–283, 115–118; 348/169–172, 699–700, 14.1–14.16; 375/240.01–240.27
  See application file for complete search history.

(56) References Cited

U.S. PATENT DOCUMENTS

| | | | |
|---|---|---|---|
| 5,774,591 A | 6/1998 | Black et al. | |
| 5,774,595 A | 6/1998 | Kim | |
| 6,546,117 B1 | 4/2003 | Sun et al. | |
| 6,574,353 B1 | 6/2003 | Schoepflin | |
| 6,611,628 B1 | 8/2003 | Sekiguchi et al. | |
| 6,625,310 B2 | 9/2003 | Lipton et al. | |
| 6,661,004 B2 | 12/2003 | Aumond et al. | |
| 6,711,278 B1 * | 3/2004 | Gu et al. | 382/103 |
| 6,731,799 B1 | 5/2004 | Sun et al. | |

(Continued)

FOREIGN PATENT DOCUMENTS

WO  WO 00/45600  8/2000

OTHER PUBLICATIONS

Jones, M. and P. Viola, "Fast Multi-View Face Detection," Mitsubishi Electrical Laboratories, Jul. 2003 (10 pp.).

(Continued)

*Primary Examiner*—Sherali Ishrat
(74) *Attorney, Agent, or Firm*—Hamilton, Brook, Smith & Reynolds, P.C.

(57) ABSTRACT

A computer system and methods for processing image data, such as video data, are described. The invention provides a representation of video data that can be used to assess agreement between the data and a fitting model for a particular parameterization of the data. This allows the comparison of different parameterization techniques and the selection of the optimum one for continued video processing of the particular data. The representation can be utilized in intermediate form as part of a larger process or as a feedback mechanism for processing video data. When utilized in its intermediate form, the invention can be used in processes for storage, enhancement, refinement, feature extraction, compression, coding, and transmission of video data. The invention serves to extract salient information in a robust and efficient manner while addressing the problems typically associated with video data sources.

19 Claims, 5 Drawing Sheets

U.S. PATENT DOCUMENTS

| | | | |
|---|---|---|---|
| 6,738,424 | B1 | 5/2004 | Allmen et al. |
| 6,751,354 | B2 | 6/2004 | Foote et al. |
| 6,774,917 | B1 | 8/2004 | Foote et al. |
| 6,912,310 | B1 * | 6/2005 | Park et al. ............... 382/199 |
| 6,925,122 | B2 | 8/2005 | Gorodnichy |
| 7,158,680 | B2 | 1/2007 | Pace |
| 7,164,718 | B2 | 1/2007 | Maziere et al. |
| 2003/0011589 | A1 | 1/2003 | Desbrun et al. |
| 2003/0103647 | A1 | 6/2003 | Rui et al. |
| 2003/0194134 | A1 | 10/2003 | Wenzel et al. |
| 2003/0235341 | A1 | 12/2003 | Gokturk et al. |
| 2004/0013286 | A1 | 1/2004 | Viola et al. |
| 2004/0107079 | A1 | 6/2004 | MacAuslan |
| 2004/0135788 | A1 | 7/2004 | Davidson et al. |
| 2006/0067585 | A1 | 3/2006 | Pace |
| 2006/0133681 | A1 | 6/2006 | Pace |
| 2006/0177140 | A1 | 8/2006 | Pace |
| 2006/0233448 | A1 | 10/2006 | Pace et al. |

OTHER PUBLICATIONS

Viola, P. and M. Jones, "Rapid Object Detection using a Boosted Cascade of Simple Features," *Proceedings of the 2001 IEEE Computer Society Conference on Computer Vision and Pattern Recognition*, 2001, vol. 1, pp. 511-518.

Gunsel, B. et al., "Content-based access to video objects: Temporal segmentation, visual summarization, and feature extraction," *Signal Processing*, vol. 66, pp. 261-280 (1998).

Piamsa-nga, P. and N. Babaguchi, "Motion estimation and detection of complex object by analyzing resampled movements of parts," in *Proc. ICIP '04*, 1 (365-368), Oct. 2004.

Vidal, R. et al., "Generalized principal component analysis (GPCA)", in *Proc. CVPR '03*, 1 (1621-628), Jun. 2003.

Vidal, R. and R. Hartley, "Motion segmentation with missing data using PowerFactorization and GPCA," in *Proc. CVPR 04*, 2 (II-310-316), Jun.-Jul. 2004.

Huang, R. et al., "Sparse representation of images with hybrid linear models," in *Proc. ICIP '04*, 2(1281-1284) Oct. 2004.

Rong, S. et al., "Efficient spatiotemporal segmentation and video object generation for highway surveillance video," in *Proc. IEEE Int'l, Conf. Communications, Circuits and Systems and West Sino Expositions*, 1(580-584), Jun.-Jul. 2002.

Toklu, C. et al., "Simultaneous Alpha Map Generation and 2-D Mesh Tracking for Multimedia Applications," *Proceedings of the International Conference on Image Processing*: 1997, (113-116). (Oct. 1997).

Urban, M., "Harris Interest Operator," Jan. 28, 2003, http://cmp.felk.cvut.cz/cmp/courses/dzo/resources/lecture_harris_urban.pdf(23 pp.).

Kass, Michael, Andrew Witzin, and Demetri Terzopoulos, "Snakes: Active contour Models," *International Journal of Computer Vision* (1988).

Rehg, J. M. and Witkin, A. P., "Visual Tracking with Deformation Models," *Proc. IEEE Int'l. Conf. on Robotics and Automation*, pp. 844-850 (Apr. 1991).

\* cited by examiner

APPARATUS AND METHOD FOR PROCESSING IMAGE DATA

RELATED APPLICATIONS

This application is a continuation of U.S. application Ser. No. 11/191,562, filed Jul. 28, 2005 now U.S. Pat. No. 7,158,680, which claims the benefit of U.S. Provisional Application No. 60/598,085, filed Jul. 30, 2004. The entire teachings of the above applications are incorporated herein by reference.

FIELD OF THE INVENTION

The present invention is generally related to the field of digital signal processing, and more particularly, to apparatus and methods for the efficient representation and processing of signal or image data, and most particularly, video data.

DESCRIPTION OF THE PRIOR ART

The general system description of the prior art in which the current invention resides can be expressed as in FIG. 1. Here a block diagram displays the typical prior art video processing system. Such systems typically include the following stages: an input stage 102, a processing stage 104, an output stage 106, and one or more data storage mechanism(s) 108.

The input stage 102 may include elements such as camera sensors, camera sensor arrays, range finding sensors, or a means of retrieving data from a storage mechanism. The input stage provides video data representing time correlated sequences of man-made and/or naturally occurring phenomena. The salient component of the data may be masked or contaminated by noise or other unwanted signals.

The video data, in the form of a data stream, array, or packet, may be presented to the processing stage 104 directly or through an intermediate storage element 108 in accordance with a predefined transfer protocol. The processing stage 104 may take the form of dedicated analog or digital devices, or programmable devices such as central processing units (CPUs), digital signal processors (DSPs), or field programmable gate arrays (FPGAs) to execute a desired set of video data processing operations. The processing stage 104 typically includes one or more CODECs (COder/DECcoders).

Output stage 106 produces a signal, display, or other response which is capable of affecting a user or external apparatus. Typically, an output device is employed to generate an indicator signal, a display, a hardcopy, a representation of processed data in storage, or to initiate transmission of data to a remote site. It may also be employed to provide an intermediate signal or control parameter for use in subsequent processing operations.

Storage is presented as an optional element in this system. When employed, storage element 108 may be either non-volatile, such as read-only storage media, or volatile, such as dynamic random access memory (RAM). It is not uncommon for a single video processing system to include several types of storage elements, with the elements having various relationships to the input, processing, and output stages. Examples of such storage elements include input buffers, output buffers, and processing caches.

The primary objective of the video processing system in FIG. 1 is to process input data to produce an output which is meaningful for a specific application. In order to accomplish this goal, a variety of processing operations may be utilized, including noise reduction or cancellation, feature extraction, object segmentation and/or normalization, data categorization, event detection, editing, data selection, data recoding, and transcoding.

Many data sources that produce poorly constrained data are of importance to people, especially sound and visual images. In most cases the essential characteristics of these source signals adversely impact the goal of efficient data processing. The intrinsic variability of the source data is an obstacle to processing the data in a reliable and efficient manner without introducing errors arising from naive empirical and heuristic methods used in deriving engineering assumptions. This variability is lessened for applications when the input data are naturally or deliberately constrained into narrowly defined characteristic sets (such as a limited set of symbol values or a narrow bandwidth). These constraints all too often result in processing techniques that are of low commercial value.

The design of a signal processing system is influenced by the intended use of the system and the expected characteristics of the source signal used as an input. In most cases, the performance efficiency required will also be a significant design factor. Performance efficiency, in turn, is affected by the amount of data to be processed compared with the data storage available as well as the computational complexity of the application compared with the computing power available.

Conventional video processing methods suffer from a number of inefficiencies which are manifested in the form of slow data communication speeds, large storage requirements, and disturbing perceptual artifacts. These can be serious problems because of the variety of ways people desire to use and manipulate video data and because of the innate sensitivity people have for some forms of visual information.

An "optimal" video processing system is efficient, reliable, and robust in performing a desired set of processing operations. Such operations may include the storage, transmission, display, compression, editing, encryption, enhancement, categorization, feature detection, and recognition of the data. Secondary operations may include integration of such processed data with other information sources. Equally important, in the case of a video processing system, the outputs should be compatible with human vision by avoiding the introduction of perceptual artifacts.

A video processing system may be described as "robust" if its speed, efficiency, and quality do not depend strongly on the specifics of any particular characteristics of the input data. Robustness also is related to the ability to perform operations when some of the input is erroneous. Many video processing systems fail to be robust enough to allow for general classes of applications—providing only application to the same narrowly constrained data that was used in the development of the system.

Salient information can be lost in the discretization of a continuous-valued data source due to the sampling rate of the input element not matching the signal characteristics of the sensed phenomena. Also, there is loss when the signal's strength exceeds the sensor's limits, resulting in saturation. Similarly, information is lost when the precision of input data is reduced as happens in any quantization process when the full range of values in the input data is represented by a set of discrete values, thereby reducing the precision of the data representation.

Ensemble variability refers to any unpredictability in a class of data or information sources. Data representative of visual information has a very large degree of ensemble variability because visual information is typically unconstrained. Visual data may represent any spatial array sequence or spatio-temporal sequence that can be formed by light incident on a sensor array.

In modeling visual phenomena, video processors generally impose some set of constraints and/or structure on the manner in which the data is represented or interpreted. As a result, such methods can introduce systematic errors which would impact the quality of the output, the confidence with which the output may be regarded, and the type of subsequent processing tasks that can reliably be performed on the data.

Quantization methods reduce the precision of data in the video frames while attempting to retain the statistical variation of that data. Typically, the video data is analyzed such that the distributions of data values are collected into probability distributions. There are also methods that project the data into phase space in order to characterize the data as a mixture of spatial frequencies, thereby allowing precision reduction to be diffused in a less objectionable manner. When utilized heavily, these quantization methods often result in perceptually implausible colors and can induce abrupt pixilation in originally smooth areas of the video frame.

Differential coding is also typically used to capitalize on the local spatial similarity of data. Data in one part of the frame tend to be clustered around similar data in that frame, and also in a similar position in subsequent frames. Representing the data in terms of it's spatially adjacent data can then be combined with quantization and the net result is that, for a given precision, representing the differences is more accurate that using the absolute values of the data. This assumption works well when the spectral resolution of the original video data is limited, such as in black and white video, or low-color video. As the spectral resolution of the video increases, the assumption of similarity breaks down significantly. The breakdown is due to the inability to selectively preserve the precision of the video data.

Residual coding is similar to differential encoding in that the error of the representation is further differentially encoded in order to restore the precision of the original data to a desired level of accuracy.

Variations of these methods attempt to transform the video data into alternate representations that expose data correlations in spatial phase and scale. Once the video data has been transformed in these ways, quantization and differential coding methods can then be applied to the transformed data resulting in an increase in the preservation of the salient image features. Two of the most prevalent of these transform video compression techniques are the discrete cosine transform (DCT) and discrete wavelet transform (DWT). Error in the DCT transform manifests in a wide variation of video data values, and therefore, the DCT is typically used on blocks of video data in order to localize these false correlations. The artifacts from this localization often appear along the border of the blocks. For the DWT, more complex artifacts happen when there is a mismatch between the basis function and certain textures, and this causes a blurring effect. To counteract the negative effects of DCT and DWT, the precision of the representation is increased to lower distortion at the cost of precious bandwidth.

SUMMARY OF THE INVENTION

The present invention is generally related to the field of digital signal processing, and more particularly, to apparatus and methods for the efficient representation and processing of signal or image data, and most particularly, video data.

A video processing approach is provided that has both computational and analytical advantages over existing state-of-the-art methods. The principle inventive method is the integration of a linear decompositional method, a spatial segmentation method, and a spatial normalization method. Spatially constraining video data greatly increases the robustness and applicability of linear decompositional methods. Additionally, spatial segmentation of the data can mitigate induced nonlinearity when other high variance data is spatially adjacent to the data being analyzed.

In particular, the present invention provides a means by which signal data can be efficiently processed into one or more beneficial representations. The present invention is efficient at processing many commonly occurring data sets and is particularly efficient at processing video and image data. The inventive method analyzes the data and provides one or more concise representations of that data to facilitate its processing and encoding. Each new, more concise data representation allows reduction in computational processing, transmission bandwidth, and storage requirements for many applications, including, but not limited to: coding, compression, transmission, analysis, storage, and display of the video data. The invention includes methods for identification and extraction of salient components of the video data, allowing a prioritization in the processing and representation of the data. Noise and other unwanted parts of the signal are identified as lower priority so that further processing can be focused on analyzing and representing the higher priority parts of the video signal. As a result, the video signal is represented more concisely than was previously possible. And the loss in accuracy is concentrated in the parts of the video signal that are perceptually unimportant.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

In video signal data, frames of video are assembled into a sequence of images usually depicting a three dimensional scene as projected onto a two dimensional imaging surface. Each frame, or image, is composed of picture elements (pels) that represent an imaging sensor response to the sampled signal. Often, the sampled signal corresponds to some reflected, refracted, or emitted electromagnetic energy sampled by a two dimensional sensor array. A successive sequential sampling results in a spatiotemporal data stream with two spatial dimensions per frame and a temporal dimension corresponding to the frame's order in the video sequence.

Figure 1:
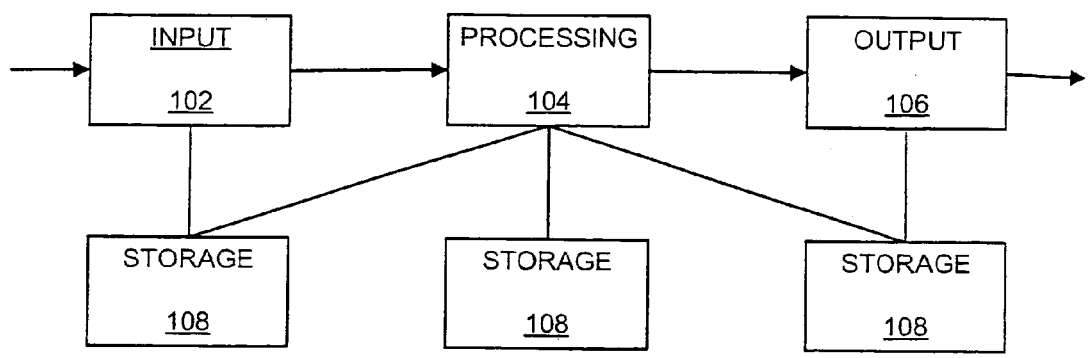
FIG. 1 is a block diagram illustrating a prior art video processing system.
Figure 2:
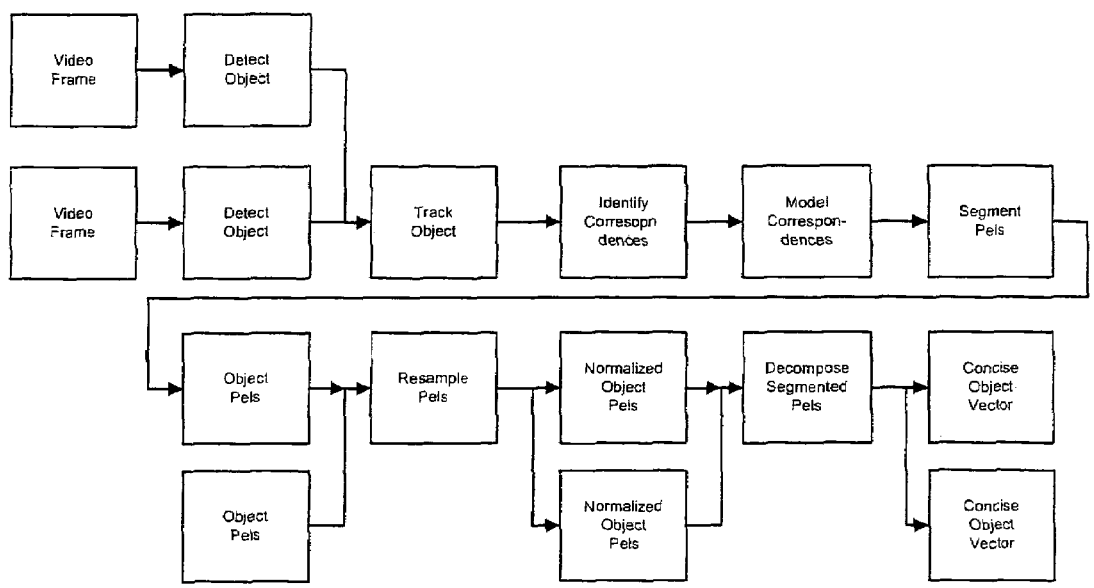
FIG. 2 is a block diagram providing an overview of the invention that shows the major modules for processing video.

The present invention as illustrated in FIG. 2 analyzes signal data and identifies the salient components. When the signal is comprised of video data, analysis of the spatiotemporal stream reveals salient components that are often specific objects, such as faces. The identification process qualifies the existence and significance of the salient components, and chooses one or more of the most significant of those qualified salient components. This does not limit the identification and processing of other less salient components after or concurrently with the presently described processing. The aforementioned salient components are then further analyzed, identifying the variant and invariant subcomponents. The identification of invariant subcomponents is the process of modeling some aspect of the component, thereby revealing a parameterization of the model that allows the component to be synthesized to a desired level of accuracy.

In one embodiment of the invention, a foreground object is detected and tracked. The object's pels are identified and segmented from each frame of the video. The block-based motion estimation is applied to the segmented object in multiple frames. These motion estimates are then integrated into a higher order motion model. The motion model is employed to warp instances of the object to a common spatial configuration. For certain data, in this configuration, more of the features of the object are aligned. This normalization allows the linear decomposition of the values of the object's pels over multiple frames to be compactly represented. The salient information pertaining to the appearance of the object is contained in this compact representation.

A preferred embodiment of the present invention details the linear decomposition of a foreground video object. The object is normalized spatially, thereby yielding a compact linear appearance model. A further preferred embodiment additionally segments the foreground object from the background of the video frame prior to spatial normalization.

A preferred embodiment of the invention applies the present invention to a video of a person speaking into a camera while undergoing a small amount of motion.

A preferred embodiment of the invention applies the present invention to any object in a video that can be represented well through spatial transformations.

A preferred embodiment of the invention specifically employs block-based motion estimation to determine finite differences between two or more frames of video. A higher order motion model is factored from the finite differences in order to provide a more effective linear decomposition.

Detection & Tracking

Once the constituent salient components of the signal have been determined, these components may be retained, and all other signal components may be diminished or removed. The retained components represent the intermediate form of the video data. This intermediate data can then be encoded using techniques that are typically not available to existing video processing methods. As the intermediate data exists in several forms, standard video encoding techniques can also be used to encode several of these intermediate forms. For each instance, the present invention determines and then employs the encoding technique that is most efficient.

A saliency analysis process detects and classifies salient signal modes. One embodiment of this process employs a combination of spatial filters specifically designed to generate a response signal whose strength is relative to the detected saliency of an object in the video frame. The classifier is applied at differing spatial scales and in different positions of the video frame. The strength of the response from the classifier indicates the likelihood of the presence of a salient signal mode. When centered over a strongly salient object, the process classifies it with a correspondingly strong response. The detection of the salient signal mode distinguishes the present invention by enabling the subsequent processing and analysis on the salient information in the video sequence.

Given the detection location of a salient signal mode in one or more frames of video, the present invention analyzes the salient signal mode's invariant features. Additionally, the invention analyzes the residual of the signal, the "less-salient" signal modes, for invariant features. Identification of invariant features provides a basis for reducing redundant information and segmenting (i.e. separating) signal modes.

Feature Point Tracking

In one embodiment of the present invention, spatial positions in one or more frames are determined through spatial intensity field gradient analysis. These features correspond to some intersection of "lines" which can be described loosely as a "corner". Such an embodiment further selects a set of such corners that are both strong corners and spatially disparate from each other, herein referred to as the feature points. Further, employing a hierarchical multi-resolution estimation of the optical flow allows the determination of the translational displacement of the feature points over time.

A non-limiting embodiment of feature tracking can be employed such that the features are used to qualify a more regular gradient analysis method such as block-based motion estimation.

Another embodiment anticipates the prediction of motion estimates based on feature tracking.

Object-Based Detection and Tracking

In one non-limiting embodiment of the current invention, a robust object classifier is employed to track faces in frames of video. Such a classifier is based on a cascaded response to oriented edges that has been trained on faces. In this classifier, the edges are defined as a set of basic Haar features and the rotation of those features by 45 degrees. The cascaded classifier is a variant of the AdaBoost algorithm. Additionally, response calculations can be optimized through the use of summed area tables.

Local Registration

Registration involves the assignment of correspondences between elements of identified objects in two or more video frames. These correspondences become the basis for modeling the spatial relationships between video data at temporally distinct points in the video data.

Various non-limiting means of registration are described for the present invention in order to illustrate specific embodiments and their associated reductions to practice in terms of well known algorithms and inventive derivatives of those algorithms.

One means of modeling the apparent optical flow in a spatio-temporal sequence can be achieved through generation of a finite difference field from two or more frames of the video data. Optical flow field can be sparsely estimated if the correspondences conform to certain constancy constraints in both a spatial and an intensity sense.

Diamond Search

Given a non-overlapping partitioning of a frame of video into blocks, search the previous frame of video for a match to each block. The full search block-based (FSBB) motion estimation finds the position in the previous frame of video that has the lowest error when compared with a block in the current frame. Performing FSBB can be quite expensive computationally, and often does not yield a better match than other motion estimation schemes based on the assumption of localized motion. Diamond search block-based (DSBB) gradient descent motion estimation is a common alternative to FSBB that uses a diamond shaped search pattern of various sizes to iteratively traverse an error gradient toward the best match for a block.

In one embodiment of the present invention, DSBB is employed in the analysis of the image gradient field between one or more frames of video in order to generate finite differences whose values are later factored into higher order motion models.

One skilled in the art is aware that block-based motion estimation can be seen as the equivalent of an analysis of vertices of a regular mesh.

Phase-Based Motion Estimation

Figure 3:
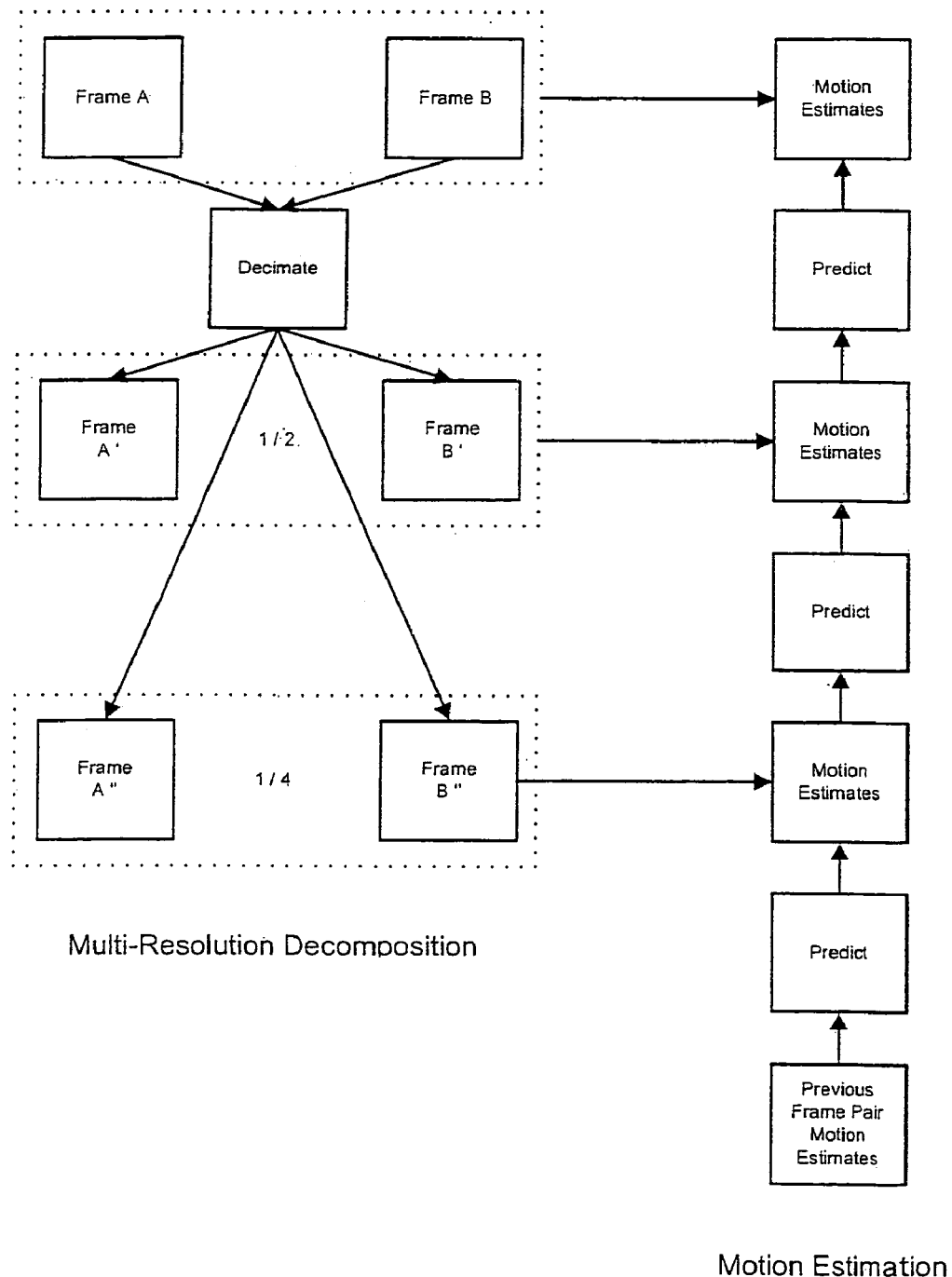
FIG. 3 is a block diagram illustrating the motion estimation method of the invention.

In the prior art, block-based motion estimation typically implemented as a spatial search resulting in one or more spatial matches. Phase-based normalized cross correlation (PNCC) as illustrated in FIG. 3 transforms a block from the current frame and the previous frame into "phase space" and finds the cross correlation of those two blocks. The cross correlation is represented as a field of values whose positions correspond to the 'phase shifts' of edges between the two blocks. These positions are isolated through thresholding and then transformed back into spatial coordinates. The spatial coordinates are distinct edge displacements, and correspond to motion vectors.

Advantages of the PNCC include contrast masking which allows the tolerance of gain/exposure adjustment in the video stream. Also, the PNCC allows results from a single step that might take many iterations from a spatially based motion estimator. Further, the motion estimates are sub-pixel accurate.

One embodiment of the invention utilizes PNCC in the analysis of the image gradient field between one or more frames of video in order to generate finite differences whose values are later factored into higher order motion models.

Global Registration

In one embodiment, the present invention factors one or more linear models from a field of finite difference estimations. The field from which such sampling occurs is referred to herein as the general population of finite differences. The described method employs robust estimation similar to that of the RANSAC algorithm.

In one embodiment of the linear model estimation algorithm, the motion model estimator is based on a linear least squares solution. This dependency causes the estimator to be thrown off by outlier data. Based on RANSAC, the disclosed method is a robust method of countering the effect of outliers through the iterative estimation of subsets of the data, probing for a motion model that will describe a significant subset of the data. The model generated by each probe is tested for the percentage of the data that it represents. If there are a sufficient number of iterations, then a model will be found that fits the largest subset of the data.

Figure 4:
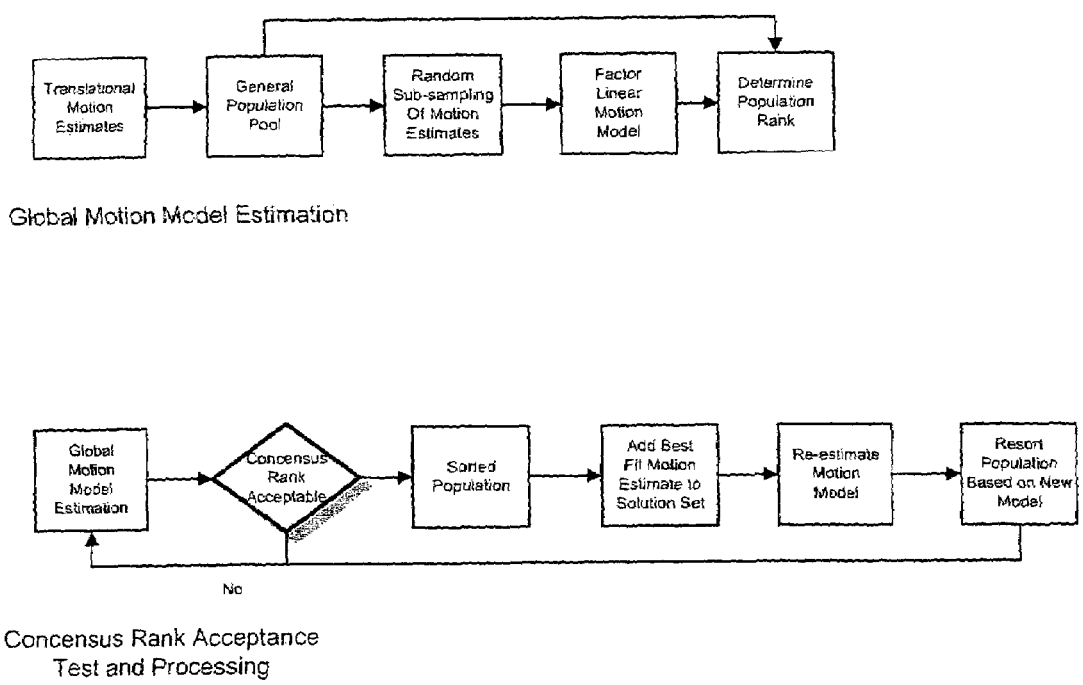
FIG. 4 is a block diagram illustrating the global registration method of the invention.

As conceived and illustrated in FIG. 4, the present invention discloses innovations beyond the RANSAC algorithm in the form of alterations of the algorithm that involve the initial sampling of finite differences (samples) and least squares estimation of a linear model. Synthesis error is assessed for all samples in the general population using the solved linear model. A rank is assigned to the linear model based on the number of samples whose residual conforms to a preset threshold, this rank is considered the "candidate consensus".

The initial sampling, solving, and ranking is performed iteratively until a termination criteria is satisfied. Once the criteria is satisfied, the linear model with the greatest rank is considered to be the final consensus of the population.

An option refinement step involves iteratively analyzing subsets of samples in the order of best fit to the candidate model, and increasing the subset size until adding one more sample would exceed a residual error threshold for the whole subset.

The described non-limiting embodiments of the invention can be further generalized as a general method of sampling a vector space, described above as a field of finite difference vectors, in order to determine subspace manifolds in another parameter vector space that would correspond to a particular linear model.

A further result of the global registration process is that the difference between this and the local registration process yields a local registration residual. This residual is the error of the global model in approximating the local model.

Normalization

Figure 5:
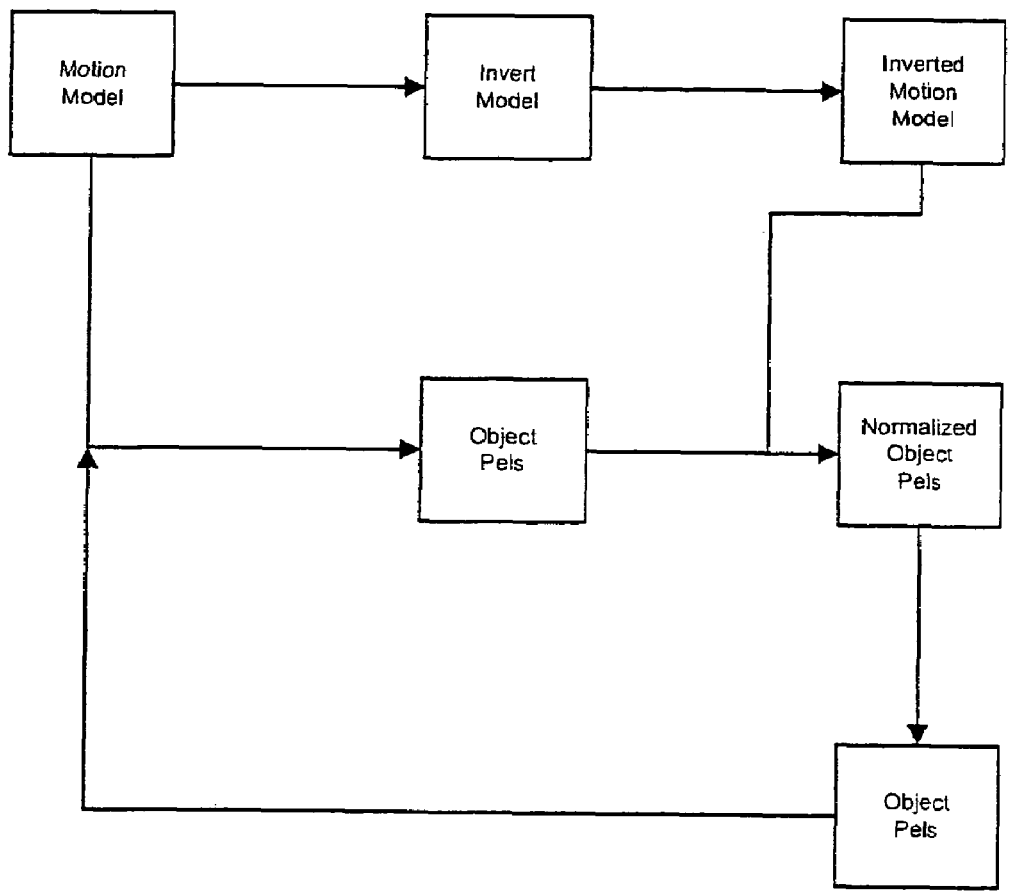
FIG. 5 is a block diagram illustrating the normalization method of the invention.

Normalization refers to the resampling of spatial intensity fields towards a standard, or common, spatial configuration. When these relative spatial configurations are invertible spatial transformations between such configurations the resampling and accompanying interpolation of pels are also invertible up to a topological limit. The normalization method of the present invention is illustrated in FIG. 5.

When more than two spatial intensity fields are normalized, increased computational efficiency may be achieved by preserving intermediate normalization calculations.

Spatial transformation models used to resample images for the purpose of registration, or equivalently for normalization, include global and local models. Global models are of increasing order from translational to projective. Local models are finite differences that imply an interpolant on a neighborhood of pels as determined basically by a block or more complexly by a piece-wise linear mesh.

Interpolation of original intensity fields to normalized intensity field increases linearity of PCA appearance models based on subsets of the intensity field.

Segmentation

The spatial discontinuities identified through the further described segmentation processes are encoded efficiently through geometric parameterization of their respective boundaries, referred to as spatial discontinuity models. These spatial discontinuity models may be encoded in a progressive manner allowing for ever more concise boundary descriptions corresponding to subsets of the encoding. Progressive encoding provides a robust means of prioritizing the spatial geometry while retaining much of the salient aspects of the spatial discontinuities.

A preferred embodiment of the present invention combines a multi-resolution segmentation analysis with the gradient analysis of the spatial intensity field and further employs a temporal stability constraint in order to achieve a robust segmentation.

One form of invariant feature analysis employed by the present invention is focused on the identification of spatial discontinuities. These discontinuities manifest as edges, shadows, occlusions, lines, corners, or any other visible characteristic that causes an abrupt and identifiable separation between pels in one or more imaged frames of video. Additionally, subtle spatial discontinuities between similarly colored and/or textured objects may only manifest when the pels of the objects in the video frame are undergoing coherent motion relative to the objects themselves, but different motion relative to each other. The present invention utilizes a combination of spectral, texture, and motion segmentation to robustly identify the spatial discontinuities associated with a salient signal mode.

Temporal Segmentation

The temporal integration of translational motion vectors, or equivalently finite difference measurements in the spatial intensity field, into a higher-order motion model is a form of motion segmentation that is described in the prior art.

In one embodiment of the invention, a dense field of motion vectors is produced representing the finite differences of object motion in the video. These derivatives are grouped together spatially through a regular partitioning of tiles or by some initialization procedure such as spatial segmentation. The "derivatives" of each group are integrated into a higher order motion model using a linear least squares estimator. The resulting motion models are then clustered as vectors in the motion model space using the k-means clustering technique. The derivatives are classified based on which cluster best fits them. The cluster labels are then spatially clustered as an evolution of the spatial partitioning. The process is continued until the spatial partitioning is stable.

In a further embodiment of the invention, motion vectors for a given aperture are interpolated to a set of pel positions corresponding to the aperture. When the block defined by this interpolation spans pels corresponding to an object boundary, the resulting classification is some anomalous diagonal partitioning of the block.

In the prior art, the least squares estimator used to integrate the derivatives is highly sensitive to outliers. The sensitivity can generate motion models that heavily bias the motion model clustering method to the point that the iterations diverge widely.

In the present invention the motion segmentation methods identify spatial discontinuities through analysis of apparent pel motion over two or more frames of video. The apparent motion is analyzed for consistency over the frames of video and integrated into parametric motion models. Spatial discontinuities associated with such consistent motion are identified. Motion segmentation can also be referred to as temporal segmentation, because temporal changes may be caused by motion. However, temporal changes may also be caused by some other phenomena such as local deformation, illumination changes, etc.

Through the describe method, the salient signal mode that corresponds to the normalization method can be identified and separated from the ambient signal mode (background or non-object) through one of several background subtraction methods. Often, these methods statistically model the background as the pels that exhibit the least amount of change at each time instance. Change can be characterized as a pel value difference. Alternatively, motion segmentation can be achieved given the detected position and scale of the salient image mode. A distance transform can be used to determine the distance of every pel from the detected position. If the pel values associated with the maximum distance are retained, a reasonable model of the background can be resolved. In other words, the ambient signal is re-sampled temporally using a signal difference metric.

Given a model of the ambient signal, the complete salient signal mode at each time instance can be differenced. Each of these differences can be re-sampled into spatially normalized signal differences (absolute differences). These differences are then aligned relative to each other and accumulated. Since these differences have been spatially normalized relative to the salient signal mode, peaks of difference will mostly correspond to pel positions that are associated with the salient signal mode.

Gradient Segmentation

The texture segmentation methods, or equivalently intensity gradient segmentation, analyze the local gradient of the pels in one or more frames of video. The gradient response is a statistical measure which characterizes the spatial discontinuities local to a pel position in the video frame. One of several spatial clustering techniques is then used to combine the gradient responses into spatial regions. The boundaries of these regions are useful in identifying spatial discontinuities in one or more of the video frames.

In one embodiment of the invention, the summed area table concept from computer graphics texture generation is employed for the purpose of expediting the calculation of the gradient of the intensity field. A field of progressively summed values is generated facilitating the summation of any rectangle of the original field through four lookups combined with four addition operations.

A further embodiment employs the Harris response which is generated for an image and the neighborhood of each pel is classified as being either homogeneous, an edge, or a corner. A response value is generated from this information and indicates the degree of edge-ness or cornered-ness for each element in the frame.

Spectral Segmentation

The spectral segmentation methods analyze the statistical probability distribution of the black and white, grayscale, or color pels in the video signal. A spectral classifier is constructed by performing clustering operations on the probability distribution of those pels. The classifier is then used to classify one or more pels as belonging to a probability class. The resulting probability class and its pels are then given a class label. These class labels are then spatially associated into regions of pels with distinct boundaries. These boundaries identify spatial discontinuities in one or more of the video frames.

The present invention may utilizes spatial segmentation based on spectral classification to segment pels in frames of the video. Futher, correspondence between regions may be determined based on overlap of spectral regions with regions in previous segmentations.

It is observed that when video frames are roughly made up of continuous color regions that are spatially connected into larger regions that correspond to objects in the video frame, identification and tracking of the colored (or spectral) regions can facilitate the subsequent segmentation of objects in a video sequence.

Appearance Modeling

A common goal of video processing is often to model and preserve the appearance of a sequence of video frames. The present invention is aimed at allowing constrained appearance modeling techniques to be applied in robust and widely applicable ways through the use of preprocessing. The registration, segmentation, and normalization described previously are expressly for this purpose.

The present invention discloses a means of appearance variance modeling. A primary basis of which being, in the case of a linear model, the analysis of feature vectors to reveal compact basis exploiting linear correlations. Feature vectors representing spatial intensity field pels can be assembled into an appearance variance model.

In an alternative embodiment, the appearance variance model is calculated from a segmented subset of the pels. Further, the feature vector can be separated into spatially non-overlapping feature vectors. Such spatial decomposition may be achieved with a spatial tiling. Computational efficiency may be achieved through processing these temporal ensembles without sacrificing the dimensionality reduction of the more global PCA method.

When generating an appearance variance model, spatial intensity field normalization can be employed to decrease PCA modeling of spatial transformations.

PCA

The preferred means of generating an appearance variance model is through the assembly of frames of video as pattern vectors into a training matrix, or ensemble, and application of Principal Component Analysis (PCA) on the training matrix. When such an expansion is truncated, the resulting PCA transformation matrix is employed to analyze and synthesize subsequent frames of video. Based on the level of truncation, varying levels of quality of the original appearance of the pels can be achieved.

The specific means of construction and decomposition of the pattern vectors is well known to one skilled in the art.

Given the spatial segmentation of the salient signal mode from the ambient signal and the spatial normalization of this mode, the pels themselves, or equivalently, the appearance of the resulting normalized signal, can be factored into linearly correlated components with a low rank parameterization allowing for a direct trade-off between approximation error and bit-rate for the representation of the pel appearance.

Sequential PCA

PCA encodes patterns into PCA coefficients using a PCA transform. The better the patterns are represented by the PCA transform, the fewer coefficients are needed to encode the pattern. Recognizing that pattern vectors may degrade as time passes between acquisition of the training patterns and the patterns to be encoded, updating the transform can help to counter act the degradation. As an alternative to generating a new transform, sequential updating of existing patterns is more computationally efficient in certain cases.

Many state-of-the-art video compression algorithms predict a frame of video from one or more other frames. The prediction model is commonly based on a partitioning of each predicted frame into non-overlapping tiles which are matched to a corresponding patch in another frame and an associated translational displacement parameterized by an offset motion vector. This spatial displacement, optionally coupled with a frame index, provides the "motion predicted" version of the tile. If the error of the prediction is below a certain threshold, the tile's pels are suitable for residual encoding; and there is a corresponding gain in compression efficiency. Otherwise, the tile's pels are encoded directly. This type of tile-based, alternatively termed block-based, motion prediction method models the video by translating tiles containing pels. When the imaged phenomena in the video adheres to this type of modeling the corresponding encoding efficiency increases. This modeling constraint assumes a certain level of temporal resolution, or number of frames per second, is present for imaged objects undergoing motion in order to conform to the translational assumption inherent in block-based prediction. Another requirement for this translational model is that the spatial displacement for a certain temporal resolution be limited; that is, the time difference between the frames from which the prediction is derived and the frame being predicted must be a relatively short amount of absolute time. These temporal resolution and motion limitations facilitate the identification and modeling of certain redundant video signal components that are present in the video stream.

Residual-Based Decomposition

In MPEG video compression, the current frame is constructed by motion compensating the previous frame using motion vectors, followed by application of a residual update for the compensation blocks, and finally, any blocks that do not have a sufficient match are encoded as new blocks.

The pels corresponding to residual blocks are mapped to pels in the previous frame through the motion vector. The result is a temporal path of pels through the video that can be synthesized through the successive application of residual values. These pels are identified as ones that can be best represented using PCA.

Occlusion-Based Decomposition

A further enhancement of the invention determines if motion vectors applied to blocks will cause any pels from the previous frame to be occluded (covered) by moving pels. For each occlusion event, split the occluding pels into a new layer. There will also be revealed pels without a history. The revealed pels are placed onto any layer that will fit them in the current frame and for which a historical fit can be made for that layer.

The temporal continuity of pels is supported through the splicing and grafting of pels to different layers. Once a stable layer model is arrived at, the pels in each layer can be grouped based on membership to coherent motion models.

Sub-Band Temporal Quantization

An alternative embodiment of the present invention uses discrete cosine transform (DCT) or discrete wavelet transform (DWT) to decompose each frame into sub-band images. Principal component analysis (PCA) is then applied to each of these "sub-band" videos. The concept is that sub-band decomposition of a frame of video decreases the spatial variance in any one of the sub-bands as compared with the original video frame.

For video of a moving object (person), the spatial variance tends to dominate the variance modeled by PCA. Sub-band decomposition reduces the spatial variance in any one decomposition video.

For DCT, the decomposition coefficients for any one sub-band are arranged spatially into a sub-band video. For instance, the DC coefficients are taken from each block and arranged into a sub-band video that looks like a postage stamp version of the original video. This is repeated for all the other sub-bands, and the resulting sub-band videos are each processed using PCA.

For DWT, the sub-bands are already arranged in the manner described for DCT.

In a non-limiting embodiment, the truncation of the PCA coefficients is varied.

Wavelet

When a data is decomposed using the discrete Wavelet transform (DWT), multiple band-pass data sets result at lower spatial resolutions. The transformation process can be recursively applied to the derived data until only single scalar values results. The scalar elements in the decomposed structure are typically related in a hierarchical parent/child fashion. The resulting data contains a multi resolution hierarchical structure and also finite differences as well.

When DWT is applied to spatial intensity fields, many of the naturally occurring images phenomena are represented with little perceptual loss by the first or second low band pass derived data structures due to the low spatial frequency. Truncating the hierarchical structure provides a compact representation when high frequency spatial data is either not present or considered noise.

While PCA may used to achieve accurate reconstruction with a small number of coefficients, the transform itself can be quite large. To reduce the size of this "initial" transform, an embedded zero tree (EZT) construction of a wavelet decomposition can be used to build a progressively more accurate version of the transformation matrix.

While this invention has been particularly shown and described with references to example embodiments thereof, it will be understood by those skilled in the art that various changes in form and details may be made therein without departing from the scope of the invention encompassed by the appended claims.

What is claimed is:

1. An image data processing system comprising:
   in a digital processor, an identification process member identifying and extracting salient components in a given image data, wherein the given image data is a sequence of video frames, and the identification process member identifying and extracting a foreground object in the sequence of video frames; and
   a prioritizer responsive to the identification process member and prioritizing processing of the given image data, including for higher priority parts of the given image data, analyzing the highest priority parts in a manner which results in relatively more concise representations than that of lower priority parts, wherein the relatively more concise representations provide reduction in at least one of: computational processing, transmission bandwidth and storage requirement of the given image data,
   the prioritizer (a) applying motion estimation to the identified and extracted foreground object in multiple video frames, resulting in multiple motion estimates, and (b) integrating the resulting motion estimates into a higher order motion model which enables compact representation of pel data corresponding to the foreground object.

2. A processing system as claimed in claim 1 wherein the prioritizer analyzes the higher priority parts by modeling one or more aspects of the identified and extracted components.

3. A processing system as claimed in claim 1 wherein the compact representation includes a linear decomposition of values of the pel data over multiple frames; and
   wherein the higher order motion model is employed to warp instances of the object into a common spatial configuration and thus effectively spatially normalizes the pel data.

4. A processing system as claimed in claim 3 wherein the prioritizer integrates linear decomposition, spatial segmentation and spatial normalization of the pel data.

5. A method of processing image data comprising the digital processing steps of:
   identifying and extracting salient components of a given image signal data, wherein the given image data is a sequence of video frames, and the step of identifying identifies and extracts a foreground object in the sequence of video frames; and
   prioritizing processing of the given image data, including for higher priority parts of the given image data, analyzing the higher priority parts in a manner that results in relatively more concise representations than that of lower priority parts;
   wherein the relatively more concise representations provide reduction in at least one of: computational processing, transmission bandwidth and storage requirement of the given image data, the step of prioritizing processing includes (a) applying motion estimation to the identified and extracted foreground object in multiple video frames, resulting in multiple motion estimates, and (b) integrating the resulting motion estimates into a higher order motion model which enables compact representation of pel data corresponding to the foreground object.

6. A method as claimed in claim 5 wherein analyzing the higher priority parts includes modeling one or more aspects of at least one of the identified and extracted components.

7. A method as claimed in claim 5 wherein the compact representation includes a linear decomposition of values of the pel data over multiple frames; and
   wherein the higher order motion model is employed to warp instances of the object into a common spatial configuration and thus effectively spatially normalizes the pel data.

8. A method as claimed in claim 7 wherein the step of prioritizing processing integrates linear decomposition, spatial segmentation and spatial normalization of the pel data.

9. A method as claimed in claim 8 wherein the spatial segmentation spatially constrains the given image data in a manner that enables the linear decomposition to mitigate any induced non-linearity.

10. A computerized method of processing image data, the method comprising the steps of:
    detecting and tracking an object of interest between two or more frames in a video frame sequence, where the object is a human face;
    segmenting the object pel data from the two or more frames of the video frame sequence by identifying corresponding elements of pel data of the object between the two or more frames to separate the object pel data from background objects;
    normalizing the object pel data to remove motion from the object relative to the two or more frames by:
       modeling motion by integrating the identified corresponding elements into a model of global motion and generating motion vectors using the identified corresponding elements; and
       encoding the normalized object separately from the background objects to remove variation in appearance of the object that is attributable to motion in one or more frames in the video sequence, said normalizing enabling compact representation of the object data; and
    restoring the normalized object using the motion modeling.

11. A computerized method of processing image data as in claim 10 wherein the motion vectors represent finite differences of object motion in the two or more frames of the video frame sequence.

12. A computerized method of processing image data as in claim 11 wherein the motion vectors are grouped together spatially through a regular partitioning of tiles or by spatial segmentation, and derivatives of each of the groups are integrated into the global motion model using a linear least squares estimator.

13. A computerized method of processing image data, comprising the steps of:
    detecting and tracking pel data of an object through two or more frames of a video frame sequence;
    segmenting the object pel data from the two or more frames of the video frame sequence by identifying corresponding elements of the object between the two or more;
    modeling the correspondences to create appearance variance models of the object pel data to assemble frames of the video frame sequence as pattern vectors into a training matrix by:
       applying principal component analysis (PCA) on the training matrix to create a PCA transformation matrix; and using the PCA transformation matrix, approximating pel data of the object in subsequent frames in the video frame sequence to create a set of one or more basis vectors providing approximations of the object;

encoding object pel data in the video frame sequence using appearance variance models, the encoding using the appearance variance models enabling compact presentation of the object pel data; and reconstructing portions of the object using the appearance variance models and the encoded pel data.

14. A computerized method of processing image data as in claim 13 wherein approximating pel data of the object in subsequent frames in the video frame sequence to create a set of one or more basis vectors providing approximations of the object further includes truncating one or more of the basis vectors to produce an encoding that provides a compact representation of the object pel data.

15. A computerized method of processing image data as in claim 14 wherein the truncation of the one or more basis vectors further includes selectively excluding vector elements from the one or more basis vectors.

16. A computerized method of processing image data as in claim 14 wherein the truncation of the one or more basis vectors is performed with wavelet transformation using an Embedded Zero Tree (EZT) truncation.

17. A computerized method of processing image data as in claim 16 wherein the EZT truncation is used to create the PCA transformation matrix.

18. A computerized method of processing image data as in claim 14 wherein the encoded object pel data produces an encoded pattern vector when projected onto the truncated one or more basis vectors.

19. A computerized method of processing image data as in claim 13 wherein the encoded object pel data may be used instead of transform coefficients in video compression algorithms.

* * * * *